(12) United States Patent
Eberspach et al.

(10) Patent No.: US 10,814,716 B2
(45) Date of Patent: Oct. 27, 2020

(54) VEHICLE TEMPERATURE CONTROL SYSTEM

(71) Applicant: Eberspächer Climate Control Systems GmbH & Co. KG, Esslingen (DE)

(72) Inventors: Günter Eberspach, Wolfschlugen (DE); Michael Humburg, Göppingen (DE); Hans Jensen, Dettingen unter Teck (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 98 days.

(21) Appl. No.: 15/960,746

(22) Filed: Apr. 24, 2018

(65) Prior Publication Data

US 2018/0304739 A1 Oct. 25, 2018

(30) Foreign Application Priority Data

Apr. 25, 2017 (DE) .................. 10 2017 108 832

(51) Int. Cl.
*B60K 11/02* (2006.01)
*B60H 1/00* (2006.01)
(Continued)

(52) U.S. Cl.
CPC .............. *B60K 11/02* (2013.01); *B60H 1/004* (2013.01); *B60H 1/00278* (2013.01);
(Continued)

(58) Field of Classification Search
CPC . B60H 1/03; B60H 1/038; B60H 1/14; B60H 1/143; B60K 11/02; B60L 11/18;
(Continued)

(56) References Cited

U.S. PATENT DOCUMENTS 5,901,780 A * 5/1999 Zeigler .................. B60H 1/032
165/42
7,043,931 B2 * 5/2006 Plummer ............... B60H 1/005
62/236
(Continued)

FOREIGN PATENT DOCUMENTS

CN 201486636 U 5/2010
CN 102574442 A 7/2012
(Continued)

*Primary Examiner* — Len Tran
*Assistant Examiner* — Gustavo A Hincapie Serna
(74) *Attorney, Agent, or Firm* — McGlew and Tuttle, P.C.

(57) ABSTRACT

A vehicle temperature control system, especially for a hybrid vehicle, includes a first heat transfer medium circuit (12) including an internal combustion engine (16), a heater (18) and one or preferably a plurality of heat transfer areas (32, 34, 36) for transferring heat between a first heat transfer medium, circulating in the first heat transfer medium circuit (12), and a first group of system areas to be thermally treated. A second heat transfer medium circuit (14) includes a heat one or preferably a plurality of heat transfer areas for the transfer of heat between a second heat transfer medium, circulating in the second heat transfer medium circuit (14), and a second group of system areas (46, 48, 50) to be thermally treated. A heat transfer medium circuit heat exchanger unit (58) transfers heat between the first heat transfer medium and the second heat transfer medium.

12 Claims, 1 Drawing Sheet

(51) Int. Cl.
*B60H 1/22* (2006.01)
*B60H 1/14* (2006.01)
*B60L 58/24* (2019.01)
*B60H 1/03* (2006.01)
*F01P 3/18* (2006.01)
*F01P 3/20* (2006.01)
*F28D 15/00* (2006.01)
*F28F 27/02* (2006.01)
*F28D 21/00* (2006.01)

(52) U.S. Cl.
CPC ......... *B60H 1/00885* (2013.01); *B60H 1/038* (2013.01); *B60H 1/14* (2013.01); *B60H 1/143* (2013.01); *B60H 1/2209* (2013.01); *B60L 58/24* (2019.02); *F01P 3/18* (2013.01); *F01P 3/20* (2013.01); *F28D 15/00* (2013.01); *F28F 27/02* (2013.01); *B60H 2001/00307* (2013.01); *B60H 2001/2287* (2013.01); *F28D 2021/0094* (2013.01); *Y10S 903/903* (2013.01)

(58) Field of Classification Search
CPC ... B60L 11/187; F01P 3/18; F01P 3/20; F28D 15/00; F28D 2021/0094; F28F 27/02
USPC .................................................. 165/52, 202
See application file for complete search history.

(56) References Cited

U.S. PATENT DOCUMENTS

| | | | | |
|---|---|---|---|---|
| 7,392,655 | B2* | 7/2008 | Inaba | F02N 19/10 60/614 |
| 9,421,845 | B2* | 8/2016 | Khelifa | B60H 1/00207 |
| 9,819,063 | B2* | 11/2017 | Blatchley | H01M 10/663 |
| 10,589,596 | B2* | 3/2020 | Riederer | B60H 1/00478 |
| 2001/0001982 | A1* | 5/2001 | Khelifa | B60H 1/00921 165/202 |
| 2004/0123976 | A1* | 7/2004 | Horn | B60H 1/323 165/42 |
| 2005/0087333 | A1* | 4/2005 | Horn | B60H 1/00492 165/203 |
| 2009/0249802 | A1* | 10/2009 | Nemesh | H01M 10/6568 62/56 |
| 2012/0241129 | A1 | 9/2012 | Kohl et al. | |
| 2014/0103128 | A1* | 4/2014 | Patel | F01P 3/20 237/5 |
| 2014/0223933 | A1* | 8/2014 | Steele | F25B 27/02 62/98 |
| 2015/0266392 | A1* | 9/2015 | Arai | B60L 11/1874 320/150 |
| 2016/0107508 | A1* | 4/2016 | Johnston | B60H 1/00278 165/202 |
| 2016/0221413 | A1* | 8/2016 | Gebbie | B60H 1/00921 |
| 2016/0229282 | A1* | 8/2016 | Hettrich | B60H 1/00278 |
| 2016/0339767 | A1 | 11/2016 | Enomoto et al. | |
| 2018/0037086 | A1* | 2/2018 | Nicgorski | B60H 1/00278 |
| 2018/0361828 | A1* | 12/2018 | Kato | F25B 25/005 |
| 2019/0263220 | A1* | 8/2019 | Bidner | B60H 1/00492 |

FOREIGN PATENT DOCUMENTS

| | | |
|---|---|---|
| CN | 103261617 A | 8/2013 |
| CN | 105835655 A | 8/2016 |
| CN | 105960345 A | 9/2016 |
| DE | 10 2008 035 955 A1 | 3/2010 |
| DE | 10 2009 042774 A1 | 3/2011 |
| DE | 10 2011 109703 A1 | 2/2012 |
| DE | 10 2012 200 391 A1 | 7/2013 |
| DE | 11 2009 004 747 B4 | 7/2014 |
| DE | 10 2013 209 045 A1 | 11/2014 |
| DE | 10 2015 106336 A1 | 10/2016 |
| DE | 11 2015 000552 T5 | 11/2016 |
| EP | 2 743 473 A1 | 6/2014 |

* cited by examiner

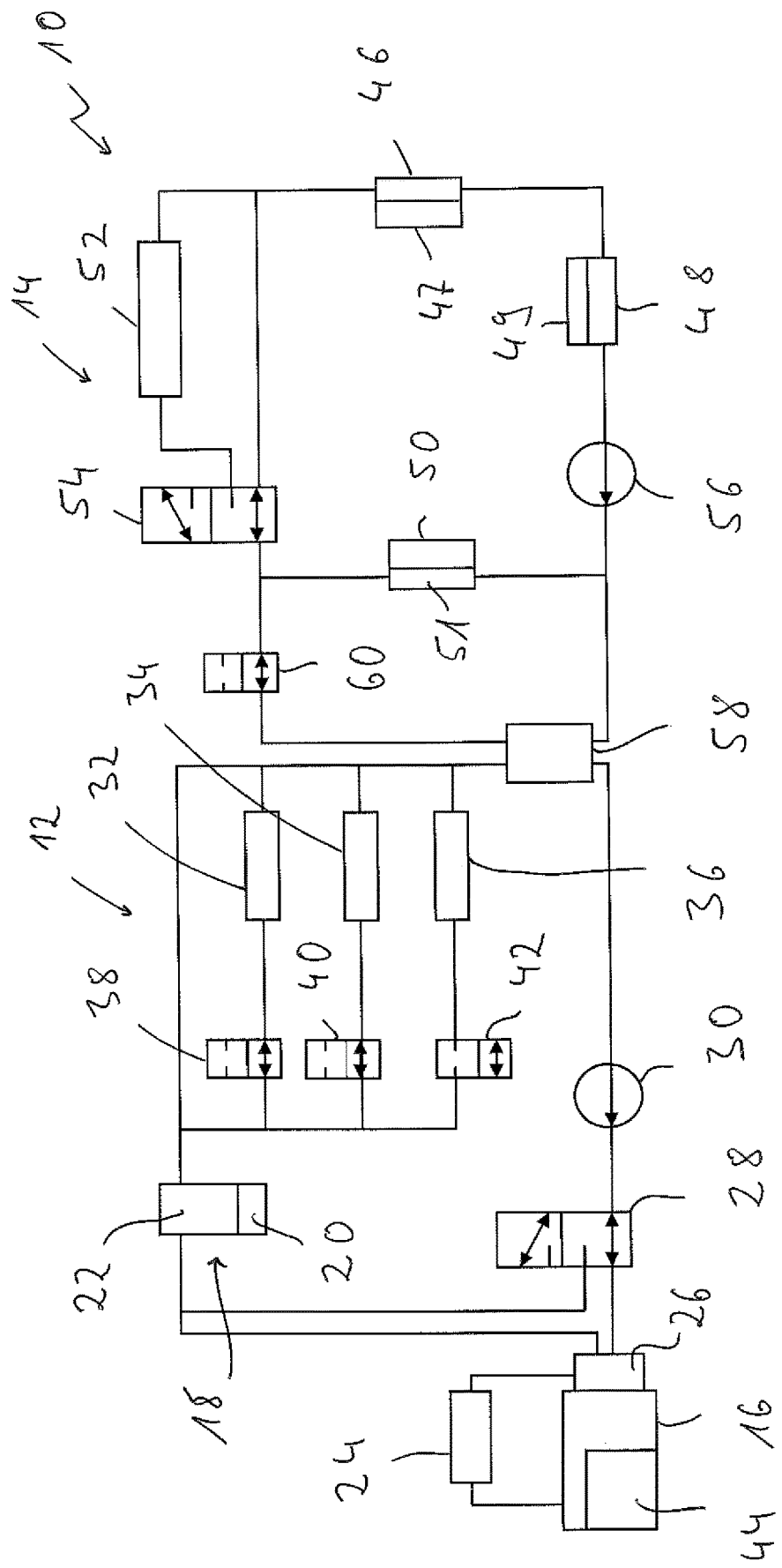

VEHICLE TEMPERATURE CONTROL SYSTEM

CROSS REFERENCE TO RELATED APPLICATIONS

This application claims the benefit of priority under 35 U.S.C. § 119 of German Application 10 2017 108 832.6, filed Apr. 25, 2017, the entire contents of which are incorporated herein by reference.

FIELD OF THE INVENTION

The present invention pertains to a vehicle temperature control system which can be used especially in hybrid vehicles, for example, plug-in hybrid vehicles.

BACKGROUND OF THE INVENTION

In hybrid vehicles, the vehicle battery used for operating an electric drive motor has a high load especially in the electric drive state due to the electric drive motor, on the one hand, and due to other consumers of electric energy, for example, the power electronics, on the other hand. Further, in such vehicle batteries, which are configured, for example, as lithium ion batteries, it is required that these lithium ion batteries shall operate in a temperature window that is optimal for the operation thereof in order to be able to ensure a sufficient supply to the consumers of electric energy, on the one hand, and also to be able to guarantee that the battery can be recharged during the charging operation, on the other hand.

SUMMARY OF THE INVENTION

An object of the present invention is to provide a vehicle temperature control system, especially for a hybrid vehicle, which makes possible an improved use of the thermal energy provided in a vehicle.

According to the present invention, this object is accomplished by a vehicle temperature control system, especially for a hybrid vehicle, comprising:
  a first heat transfer medium circuit with an internal combustion engine, with a heater and with at least one heat transfer area, preferably with a plurality of heat transfer areas for the transfer of heat between a first heat transfer medium circulating in the first heat transfer medium circuit and a first group of system areas to be thermally treated,
  a second heat transfer medium circuit with at least one heat transfer area, preferably with a plurality of heat transfer areas for the transfer of heat between a second heat transfer medium circulating in the second heat transfer medium circuit and a second group of system areas to be thermally treated, and
  a heat transfer medium circuit heat exchanger unit for the transfer of heat between the first heat transfer medium circulating in the first heat transfer medium circuit and the second heat transfer medium circulating in the second heat transfer medium circuit.

The vehicle temperature control system configured according to the present invention comprises heat transfer medium circuits, which are, in principle, coupled to one another for the exchange of heat, but are actually associated with different system areas of a vehicle. Thus, for example, the first heat transfer medium circuit may essentially be associated with an internal combustion engine or with the system areas associated with an internal combustion engine to thermally treat these system areas in a suitable manner, while the second heat transfer medium circuit may be essentially associated with the systems areas of a vehicle provided for an electric drive operation. Due to the possibility of exchanging heat energy between these two heat transfer medium circuits, the excess thermal energy present in one of the circuits may be transferred to the other circuit in order to heat this circuit or these system areas associated with this circuit. Thus, it is possible to the greatest possible extent to avoid that thermal energy generated in a vehicle is emitted outwards as heat due to energy losses.

In order to be able to use the internal combustion engine as a heat source or a heat sink as a function of the thermal conditions, it is proposed that the first heat transfer medium circuit comprise a first heat transfer medium circuit valve array to release/block the internal combustion engine for/against the flow of the first heat transfer medium.

According to an especially advantageous aspect, provisions may be made for the first heat transfer medium to be able to flow through the heat transfer medium circuit heat exchanger unit or/and a heater heat exchanger unit of the heater regardless of the switching position of the first heat transfer medium circuit valve array. It is thus guaranteed that, regardless of whether system areas associated with the first heat transfer medium circuit are to be thermally treated, a thermal interaction with the heater, on the one hand, and the other heat transfer medium circuit, on the other hand, is made possible.

In order to be able to heat the system areas associated with the first heat transfer medium circuit in a suitable manner or possibly to dissipate heat from these system areas, it is proposed that the first heat transfer medium circuit comprise a system area heat exchanger unit in association with at least one system area, preferably with each system area of the first group of system areas for the transfer of heat between the system area and the first heat transfer medium.

In this connection, a thermal treatment of individual system areas independent of other system areas can be guaranteed by the first heat transfer medium circuit comprising a system area valve array in association with at least one system area, preferably with each system area of the first group of system areas for releasing/blocking the system area heat exchanger unit for/against the flow of the first heat transfer medium.

The first group of system areas may comprise one or more of the system areas indicated below:
  the internal combustion engine oil provided in the internal combustion engine,
  the transmission fluid provided in a transmission associated with the internal combustion engine,
  the interior of a vehicle.

The internal combustion engine may comprise a heat transfer medium jacket through which the first heat transfer medium can flow, wherein a first cooler heat exchanger unit is associated with the internal combustion engine for the emission of heat from the first heat transfer medium flowing through the heat transfer medium jacket.

The second group of system areas may comprise one or more of the system areas indicated below:
  a vehicle battery,
  a battery charger,
  vehicle electronics.

While the first group of system areas essentially comprises system areas that are in connection with the internal combustion engine and are thermally treated by the heat generated in the internal combustion engine in conventional vehicles as well, the second group of system areas essentially comprises system areas that are used or are necessary primarily for the electric driving of a vehicle.

It should be noted that in the sense of the present invention a group of system areas may comprise a single system area or a plurality of system areas.

According to an especially advantageous aspect, it is proposed that the second heat transfer medium in the second heat transfer medium circuit can flow in series through the heat transfer medium circuit heat exchanger unit and the vehicle battery or/and vehicle electronics, or/and that in the second heat transfer medium circuit, the second heat transfer medium can flow parallel through the heat transfer medium circuit heat exchanger unit and the battery charger. Due to the parallel flowability through the heat transfer medium circuit heat exchanger unit and the battery charger, it is guaranteed that the heat energy in the area of the heat transfer medium circuit heat exchanger unit to the second heat transfer medium is essentially not used to heat the battery charger because the battery charger is a thermally essentially noncritical assembly unit and does not have to be thermally treated for suitable operation.

It should be noted that when it is stated that a heat transfer medium can flow through a system area, for example, the vehicle battery, this system area comprises a heat exchanger unit through which the heat transfer medium can flow, in which, for example, heat can be absorbed from the heat transfer medium and then be transferred to the areas to be thermally treated during the operation of a respective system area or can be transferred from these areas to the heat transfer medium flowing through the respective associated heat exchanger unit.

In order to be able to use the heat transfer medium circuit heat exchanger unit for the transfer of heat or to block this heat transfer medium circuit heat exchanger unit against a transfer of heat, it is proposed that the second heat transfer medium circuit comprise a second heat transfer medium circuit valve array for releasing/blocking the heat transfer medium circuit heat exchanger unit for/against the flow of the second heat transfer medium. Thus, no structural changes need to be made in the area of the first heat transfer medium circuit to activate or to deactivate the heat transfer medium circuit heat exchanger unit.

The second heat transfer medium may be able to flow in series through the heat transfer medium circuit heat exchanger unit and the second heat transfer medium circuit valve array and parallel together in relation to the battery charger.

Since heat can be generated during the electric drive operation in the area of the system areas used for this operation and this heat has to be dissipated as a function of the ambient conditions in order to avoid overheating, it is proposed that the second heat transfer medium circuit comprise a second circuit cooler heat exchanger unit for the emission of heat from the second heat transfer medium circulating in the second heat transfer medium circuit.

For this, a cooler valve array may be associated with the second cooler heat exchanger unit for releasing/blocking the second cooler heat exchanger unit for/against the flow of the second heat transfer medium.

In order to be able to generate a circulation of the heat transfer medium provided there in the two respective heat transfer medium circuits, each heat transfer medium circuit may comprise at least one heat transfer medium pump.

According to another especially advantageous aspect of the present invention, there is no heat transfer medium exchange connection between the first heat transfer medium circuit and the second heat transfer medium circuit. It is thus guaranteed that a thermal interaction leading to an excessive heating or cooling between the two heat transfer medium circuits cannot occur.

The heater may be a fuel-operated heater. This guarantees that even when the vehicle battery is loaded, for example, during the electric drive operation, heat especially for heating the interior of a vehicle may be provided and the vehicle battery is not additionally loaded for this, so that the range during the electric drive operation can be increased.

The present invention is described in detail below with reference to the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic diagram view showing a vehicle temperature control system according to the invention.

DESCRIPTION OF THE PREFERRED EMBODIMENTS

Referring to the drawings, a vehicle temperature control system is generally designated by 10 in FIG. 1. The vehicle temperature control system 10 comprises two heat transfer medium circuits 12, 14, which are or can be brought into thermal interaction with one another, but between which there is no heat transfer medium exchange connection. The first heat transfer medium circulating in the first heat transfer medium circuit 12 cannot reach the second heat transfer medium circuit 14, while the second heat transfer medium circulating in the second heat transfer medium circuit 14 cannot reach the first heat transfer medium circuit. Nevertheless, the same, preferably liquid medium, for example, essentially water, can be used for the first heat transfer medium and the second heat transfer medium.

The first heat transfer medium circuit 12 comprises as essential components an internal combustion engine 16 which can be used as a drive unit for a vehicle as well as a preferably fuel-operated heater 18 with a burner area 20 and with a heater heat exchanger unit 22. The first heat transfer medium circulating in the first heat transfer medium circuit 12 can flow through a heat transfer medium jacket of the internal combustion engine 16 and the heater heat exchanger unit 22.

A first cooler heat exchanger unit 24 is associated with the internal combustion engine 16. The first cooler heat exchanger unit 24 can be released for flow by means of a thermostat unit 26, so that, for example, in a state, in which the first heat transfer medium has a sufficiently high temperature or shall not be further heated, excess heat can be emitted to the surrounding area. Because the supply of additional energy into the first heat transfer medium is not necessary in this state, the heater 18 is not operated, so that the first heat transfer medium flows through the heater heat exchanger unit 22 without absorbing heat there.

The first heat transfer medium circuit 12 further comprises a first heat transfer medium circuit valve array 28. The internal combustion engine 16 can be released for the flow of the first heat transfer medium by means of this first heat transfer medium circuit valve array 28 as a function of the switching position thereof, as this is the case in the switching position shown in FIG. 1, or it can be blocked against flow, so that the heat transfer medium circulating in the first heat transfer medium circuit 12 does not flow through the internal combustion engine, but through the heater heat exchanger unit 22 due to the feed action of a heat transfer medium 30.

The first heat transfer medium circuit 12 further comprises a plurality of system area heat exchanger units 32, 34 36, which are connected or can be connected parallel to one another, and system area valve arrays 38, 40, 42 associated with each of these system area heat exchanger units. The system area heat exchanger units 32, 34, 36 associated with each of the system area valve arrays 38, 40, 42 can be released or blocked for/against flow by the system area valve arrays 38, 40, 42.

The system area heat exchanger units 32, 34, 36 are each associated with different system areas of a first group of system areas, wherein the first group of system areas is characterized in that the system areas thereof can be heated directly by the first heat transfer medium circulating in the first heat transfer medium circuit 12 or heat can be transferred to this heat transfer medium. Thus, for example, the system area heat exchanger unit 32 may be provided to establish a thermal interaction with the internal combustion engine oil of the internal combustion engine 16 to be considered as such a system area of the first group. For this, for example, the system area heat exchanger unit 32 can be arranged in the area of an oil pan of the internal combustion engine 16 or can be connected via corresponding wired connections to the internal combustion engine 16 in order to transfer heat from the internal combustion engine oil to the first heat transfer medium, or vice versa. The system area heat exchanger unit 34 may be provided in association with the transmission fluid of a transmission associated with the internal combustion engine 16, which transmission fluid is to be considered as another system area of the first group of system areas in order to transfer heat from the transmission fluid into the first heat transfer medium, or vice versa, as a function of the thermal conditions. The system area heat exchanger unit 36 may be provided to heat air to be introduced into a vehicle interior to be considered as another system area of the first group of system areas. For this, this air fed by a blower can flow around the system area heat exchanger unit 36.

Depending on the thermal conditions, it is thus possible to transfer heat to the different system areas or to absorb heat from these system areas and to transfer it to one or more other system areas or to heat one or more of these system areas, as well as the internal combustion engine 16 itself, by the heater 18.

The second heat transfer medium circuit 14 comprises, for example, one or more vehicle batteries 46, for example, lithium ion batteries, a vehicle electronics 48 or a part of the vehicle electronics 48, especially power electronics, as well as a battery charger 50, via which the vehicle battery 46 can be charged, for example, from a stationary power grid, through which the second heat transfer medium can flow in series. Further, the second heat transfer medium circuit 14 comprises a second cooler heat exchanger unit 52, which can be released for the flow of the second heat transfer medium fed by means of a heat transfer medium pump 56 or be blocked against flow. The heat generated during the loading of the different system areas provided especially for the electric drive operation of a vehicle can thus be emitted to the surrounding area, if needed, via the second cooler heat exchanger unit 52, provided there is a risk of an excess heating of these system areas. It should be noted here that for a thermal interaction with the second heat transfer medium circulating in the second heat transfer medium circuit, the system areas of a second group of system areas, which are associated with the second heat transfer medium circuit, i.e., for example, the vehicle battery 46, the vehicle electronics 48 as well as the battery charger 50, may have heat exchanger units 47, 49, 51 through each of which the second heat transfer medium can flow.

A heat transfer medium circuit heat exchanger unit 58 is provided to thermally couple the two heat transfer medium circuits 12, 14 to one another. Both the first heat transfer medium and the second heat transfer medium can flow through this heat transfer medium circuit heat exchanger unit, so that heat from the hotter heat transfer medium can be transferred to the colder heat transfer medium. In this case, the heat transfer medium circuit heat exchanger unit 58 in association with the first heat transfer medium circuit 12 is arranged in series to the heater heat exchanger unit 22 and, regardless of the switching state of the first heat transfer medium circuit valve array 28, the first heat transfer medium can flow through this heater heat exchanger unit as well. In association with the second heat transfer medium circuit 14, the heat transfer medium circuit heat exchanger unit 58 is arranged in series to the vehicle battery 46 and the vehicle electronics 48 and is arranged parallel to the charger 50 together with a second heat transfer medium circuit valve array 60.

If the second heat transfer medium circuit valve array 60 is in its switching state shown in FIG. 1, in which it releases the heat transfer medium circuit heat exchanger unit 58 for flow, the second heat transfer medium circulates through the heat transfer medium circuit heat exchanger unit 58, the vehicle battery 46 and the vehicle electronics 48. In this state, the second heat transfer medium may absorb heat from the first heat transfer medium in the heat transfer medium circuit heat exchanger unit 58 and transfer it to the system areas or some of the system areas of the second group of system areas and thus heat these system areas. If these system areas are sufficiently hot or if these shall possibly be cooled, i.e., heat is dissipated by the heat transfer medium, then this may, for example, take place via the second cooler heat exchanger unit 52 when the heat transfer medium circuit heat exchanger unit 58 is blocked by the second heat transfer medium circuit valve array 60, or may be transferred to the first heat transfer medium via the heat transfer medium circuit heat exchanger unit 58 released for flow by the second heat transfer medium circuit valve array 60, provided that this excess heat can be used in the area of one of the system areas of the first group of system areas.

The vehicle temperature control system configured according to the present invention thus makes possible a higher variability in the utilization of the heat generated in the area of a vehicle, but at the same time ensures that the groups of system areas associated with the two heat transfer medium circuits can be thermally treated in a suitable manner in each of the heat transfer medium circuits even regardless of the other group. Thus, for example, the internal combustion engine 16 may already be thermally treated, for example, by operating the heater 18 in the first heat transfer medium circuit 12, when the heat transfer medium circuit heat exchanger unit 58 is blocked against flow and the hybrid vehicle is operated in electric drive operation, in order to ensure that when a transfer has to be made or shall be made from an electric drive operation into an internal combustion engine drive operation, the internal combustion engine 16 or the internal combustion engine oil and the transmission fluid are already sufficiently heated. The internal combustion engine 16 can then be put into operation in a thermally treated state leading to a reduced emission of harmful substances. On the other hand, system areas of the second group of system areas can be sufficiently heated by heat provided, for example, by the internal combustion engine 16 or/and the heater 18 in the area of the first heat transfer medium circuit 12, which can especially be used to provide the battery temperature necessary for a suitable recovery of the vehicle battery 46 or to reach this temperature faster.

While specific embodiments of the invention have been shown and described in detail to illustrate the application of the principles of the invention, it will be understood that the invention may be embodied otherwise without departing from such principles.

What is claimed is:

1. A vehicle temperature control system comprising:
    a first heat transfer medium circuit;
    an internal combustion engine connected to the first heat transfer medium circuit;
    a fuel operated heater having a burner area and a heat exchanger unit connected to the first heat transfer medium circuit for transferring heat generated in the burner area to a first heat transfer medium circulating in the first heat transfer medium circuit;
    at least one first heat transfer area, connected to the first heat transfer medium circuit, for a transfer of heat between the first heat transfer medium circulating in the first heat transfer medium circuit and a first group of system areas to be thermally treated;
    a second heat transfer medium circuit;
    at least one second heat transfer area, connected to the second heat transfer medium circuit, for a transfer of heat between a second heat transfer medium circulating in the second heat transfer medium circuit and a second group of system areas to be thermally treated; and
    a heat transfer medium circuit heat exchanger unit for the transfer of heat between the first heat transfer medium circulating in the first heat transfer medium circuit and the second heat transfer medium circulating in the second heat transfer medium circuit,
    wherein the second group of system areas comprises one or more of:
    a vehicle battery;
    a battery charger; and
    a vehicle electronics,
    wherein:
    in the second heat transfer medium circuit, the second heat transfer medium flows in series through the heat transfer medium circuit heat exchanger unit and the vehicle battery; or
    in the second heat transfer medium circuit, the second heat transfer medium flows in series through the heat transfer medium circuit heat exchanger unit and the vehicle electronics system; or
    in the second heat transfer medium circuit, the second heat transfer medium flows in series through the heat transfer medium circuit heat exchanger unit and the vehicle battery and the vehicle electronics system; or
    in the second heat transfer medium circuit, the second heat transfer medium flows in parallel through the heat transfer medium circuit heat exchanger unit and the battery charger; or
    in the second heat transfer medium circuit, the second heat transfer medium flows in series through the heat transfer medium circuit heat exchanger unit and the vehicle battery and in the second heat transfer medium circuit, the second heat transfer medium flows in parallel through the heat transfer medium circuit heat exchanger unit and the battery charger; or
    in the second heat transfer medium circuit, the second heat transfer medium flows in series through the heat transfer medium circuit heat exchanger unit and the vehicle electronics system and in the second heat transfer medium circuit, the second heat transfer medium flows in parallel through the heat transfer medium circuit heat exchanger unit and the battery charger; or
    in the second heat transfer medium circuit, the second heat transfer medium flows in series through the heat transfer medium circuit heat exchanger unit and the vehicle battery and in the second heat transfer medium circuit, the second heat transfer medium flows in parallel through the heat transfer medium circuit heat exchanger unit and the battery charger.

2. The vehicle temperature control system in accordance with claim 1, wherein the first heat transfer medium circuit comprises a first heat transfer medium circuit valve array for:
    releasing the internal combustion engine for flow of the first heat transfer medium; and
    blocking the internal combustion engine against flow of the first heat transfer medium.

3. The vehicle temperature control system in accordance with claim 2, wherein:
    the first heat transfer medium flows through the heat transfer medium circuit heat exchanger unit regardless of a switching position of the first heat transfer medium circuit valve array; or
    the first heat transfer medium flows through the heat exchanger unit of the heater regardless of a switching position of the first heat transfer medium circuit valve array; or
    the first heat transfer medium flows through the heat transfer medium circuit heat exchanger unit and the first heat transfer medium flows through the heat exchanger unit of the heater regardless of a switching position of the first heat transfer medium circuit valve array.

4. The vehicle temperature control system in accordance with claim 1, wherein the at least one first heat transfer area connected to the first heat transfer medium circuit comprises a system area heat exchanger unit in association with at least one system area of the first group of system areas for the transfer of heat between the system area and the first heat transfer medium.

5. The vehicle temperature control system in accordance with claim 4, wherein the first heat transfer medium circuit comprises a system area valve array in association with the at least one system area of the first group of system areas for:
    releasing the system area heat exchanger unit for flow of the first heat transfer medium; and
    blocking the system area heat exchanger unit against flow of the first heat transfer medium.

6. The vehicle temperature control system in accordance with claim 1, wherein the first group of system areas comprises one or more of:
    an internal combustion engine oil system provided in the internal combustion engine;
    a transmission fluid system provided in a transmission associated with the internal combustion engine; and
    an interior of a vehicle.

7. The vehicle temperature control system in accordance with claim 1, further comprising a cooler heat exchanger unit wherein:
the internal combustion engine comprises a heat transfer medium jacket through which the first heat transfer medium flows; and
the cooler heat exchanger unit is associated with the internal combustion engine for the emission of heat from the first heat transfer medium flowing through the heat transfer medium jacket.

8. The vehicle temperature control system in accordance with claim 1, wherein the second heat transfer medium circuit comprises a second heat transfer medium circuit valve array for:
releasing the heat transfer medium circuit heat exchanger unit for flow of the second heat transfer medium; and
blocking the heat transfer medium circuit heat exchanger unit against flow of the second heat transfer medium.

9. The vehicle temperature control system in accordance with claim 1, wherein the second heat transfer medium flows in series through the heat transfer medium circuit heat exchanger unit and the second heat transfer medium circuit valve array and parallel together in relation to the battery charger.

10. The vehicle temperature control system in accordance with claim 1, wherein the second heat transfer medium circuit comprises a second circuit cooler heat exchanger unit for the emission of heat from the second heat transfer medium circulating in the second heat transfer medium circuit.

11. The vehicle temperature control system in accordance with claim 10, wherein a second circuit cooler valve array is associated with the second circuit cooler heat exchanger unit for:
releasing the second cooler heat exchanger unit for flow of the second heat transfer medium through the second circuit cooler heat exchanger unit; and
blocking the second cooler heat exchanger unit against flow of the second heat transfer medium through the second circuit cooler heat exchanger unit.

12. The vehicle temperature control system in accordance with claim 1, wherein:
each of the first heat transfer medium circuit and the second heat transfer medium circuit comprises at least one heat transfer medium pump; or
there is no heat transfer medium exchange connection between the first heat transfer medium circuit and the second heat transfer medium circuit; or
any combination of each of the first heat transfer medium circuit and the second heat transfer medium circuit comprises at least one heat transfer medium pump and there is no heat transfer medium exchange connection between the first heat transfer medium circuit and the second heat transfer medium circuit.

\* \* \* \* \*